Nov. 10, 1931.  P. E. J. GRATAMA  1,831,170
APPARATUS FOR CONTINUOUS CLARIFICATION OF LIQUIDS
Filed July 14, 1930
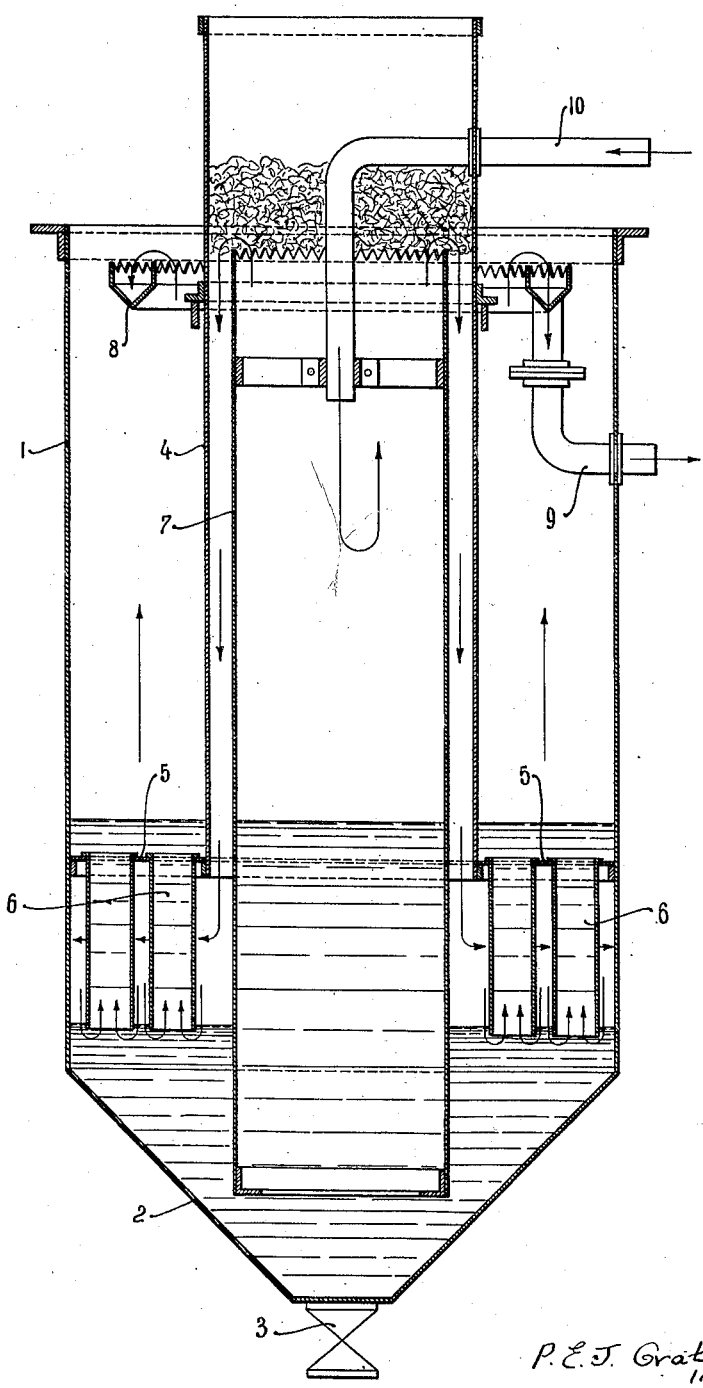
P. E. J. Gratama
INVENTOR
By: Marks & Clerk
Attys.

Patented Nov. 10, 1931

1,831,170

UNITED STATES PATENT OFFICE

PETRUS E. J. GRATAMA, OF SOERABAYA, DUTCH EAST INDIES

APPARATUS FOR CONTINUOUS CLARIFICATION OF LIQUIDS

Application filed July 14, 1930, Serial No. 467,893, and in the Netherlands September 1, 1929.

This invention relates to apparatus for separating both the heavier and the lighter solids from a liquid, leaving the solids in a concentrated form and the liquid substantially clear and free thereof. Apparatus in accordance with the invention is specially suitable for defecation purposes, i. e. the clarification or purification of sugar cane raw juices already limed and heated to near the boiling point.

Up till now this separation of the solids from the sugar cane raw juices, in which the same are held in suspension, is ordinarily carried out intermittently in tanks, in which the juice has to stand over during a relatively long time, whereby its temperature falls sometimes as much as 20° C. In the defecator constructed in accordance with my invention the raw juice is clarified in continuous operation in such a manner that it leaves the apparatus, fully purified, only a few minutes after the turbid liquid has been introduced thereinto, so that its temperature falls only one or two degrees and considerable heat economy is attained.

In order that my invention may be fully understood, I shall now proceed to describe the same with reference to the annexed more or less diagrammatic drawing, showing a preferred embodiment thereof in vertical sectional elevation.

As shown, the apparatus comprises an upright, cylindrical shell 1 provided with a converging, preferably inverted conical bottom 2 having a central outlet provided with a control valve 3.

Centrally within the shell 1 is a cylindrical downtake 4, the lower edge of which is situated a certain distance above the plane where the shell 1 joins the bottom 2, its top edge lying a considerable distance above that of the shell.

Intermediate between the lower edge of the downtake 4 and the inner wall of the shell 1 is a horizontal annular plate 5 having a relatively great number of evenly distributed holes having downturned edges. As shown, these edges are formed by loose sleeves 6 with flanged top edges, by means of which they are loosely supported by plate 5 so that they can be readily taken out for cleaning purposes.

Arranged centrally within the downtake 4 is a cylindrical tube 7, the bottom edge of which is a little above the bottom outlet, its top edge being at a level a little below that of shell 1.

Secured to the downtake 4 is an annular trough or gutter 8, from the bottom of which is carried a discharge pipe 9 extending through an opening of the tank 1 to the exterior of the apparatus.

The inlet pipe 10 for the turbid liquid, for instance, the raw juice, is passed through the downtake 4 at a certain distance above the top edge of the shell 1, said pipe having a downturned end opening centrally in the tubular member 7 a certain distance below the top edge thereof.

The horizontal top edges of the member 7 and of the gutter 8 are serrated, thereby allowing the liquid to overflow in an even, thin stream.

If desired, inspection windows can be provided in the tank 1, the downtake 4 and the tubes 7, but the drawing does not show them.

The described apparatus operates as follows:

During operation, the solid impurities suspended in the magma or turbid material will settle on the bottom 2, forming a thick layer of mud thereon.

This layer is allowed to rise to a small distance above the lower edges of the sleeves 6, after which care is taken to keep the surface of said layer at said level, this being done either manually or automatically by means well known in the art. As said means do not form part of this invention, they have not been shown on the drawing.

The raw juice supplied by pipe 10 flows downwardly into the inner tube 4, where the heavier solids contained therein settle and accumulate on the bottom 2. The layer of mud on the bottom offers considerable resistance to the flow of liquid so that this is subjected to upward deflection and overflows over the serrated top edge of tube 7, where it is subjected to abrupt downward deflection to flow downwardly through the channel between tube 7 and downtake 4. From said downtake the liquid, which still contains the lighter impurities in suspension, spreads in a substantially horizontal direction in the quiescent space around the sleeves 6 below the plate 5. The liquid is thus subjected, in a quiescent space, to reduction of its velocity resulting from increase in the cross sectional area of the conduit in which it flows, so that also the lighter impurities are projected.

After the juice has thus lost by far the greater part of its solid impurities, it rises through the sleeves 6, the cross sectional areas and number of which should be preferably be so that the velocity of the liquid remains substantially unaltered. The sleeves are filled with a suspension of the lighter impurities, their lower edges reaching down into the layer of mud on the bottom 2. Furthermore, a layer of very light impurities will precipitate on the plate 5, whereas the space around the sleeves is occupied by juice flowing partly in a horizontal and partly in a downward direction.

The mud below and in the sleeves and the layer of solids on the plate 5 function as a filter for the juice rising therethrough at a very low velocity. During this flow the juice still contains a small amount of the smallest particles, but as soon as it reaches the top of the sleeves 6, the cross sectional area of the channel abruptly increases, that is to say, the velocity of flow suddenly decreases. Besides, the liquid then flows through the layer of solids on the plate 5, which solids have a slow downward movement, because the sludge valve 3 allows the mud to slowly fall out of the apparatus. Thus a very efficient clarification of the juice is obtained so that the effluent from the outlet pipe 9 is substantially clear.

It will be understood that the efficiency of the purification depends, inter alia, upon the velocity at which the juice is allowed to circulate through the defecator.

The reason why the downtake 4 should extend a considerable height above the top edge of the tube 7 is, that a rather heavy layer of foam may be formed by the magma flowing into the liquid already in the apparatus. Even by introducing the liquid below the surface of the juice within the tube 7 this foam formation cannot altogether be avoided.

I wish to observe that the shape and construction of this apparatus may be changed within certain limits, without in any way affecting the essential character or spirit of this invention, which is set forth in the appended claims.

What I claim is:—

1. An apparatus for continuous clarification of liquids, comprising an upright outer shell having a converging bottom; a mud outlet in said bottom; a control valve in said outlet; a tubular member placed centrally within said shell and having its lower edge a little above the said bottom; a downtake placed centrally intermediate between said tubular member and said shell, the bottom and top edges of said downtake being situated above the bottom and the top edges, respectively, of the said tubular member; a horizontal, annular plate closing the channel between the shell and the downtake near the lower edge of the latter and provided with a plurality of evenly distributed holes; sleeves joining the edges of said holes and extending from the said plate downward; a pipe for supplying the turbid liquid to be clarified into the said tubular member; and a discharge pipe for the clarified liquid having its intake opening in the channel between the downtake and the shell a little below the top edge of the said tubular member.

2. An apparatus for continuous clarification of liquids, comprising an upright outer shell having a converging bottom; a mud outlet in said bottom; a control valve in said outlet; a tubular member placed centrally within said shell and having a serrated top edge the lower edge of said tubular member being situated a little above said bottom; a downtake placed centrally intermediate between said tubular member and said shell, the bottom and top edges of said downtake being situated above the bottom and the top edges, respectively, of the said tubular member; a horizontal annular plate closing the channel between the shell and the downtake near the lower edge of the latter and provided with a plurality of evenly distributed holes; sleeves joining the edges of said holes and extending from the said plate downward; a pipe for supplying the turbid liquid to be clarified into the said tubular member; a gutter around the said downtake and having a serrated top edge a little below the serrated top edge of the said tubular member; and a discharge pipe for the clarified liquid having its intake opening in the said gutter.

In testimony whereof I affix my signature.

PETRUS E. J. GRATAMA.